(No Model.)

J. G. CALHOUN.
GATE.

No. 300,444. Patented June 17, 1884.

Attest—
Harry D. Beatty
Charles F. Day.

Inventor
James G. Calhoun
By Bradford Howland
Attorney.

UNITED STATES PATENT OFFICE.

JAMES G. CALHOUN, OF EDINBURG, OHIO, ASSIGNOR OF ONE-HALF TO SAMUEL CALHOUN, OF SAME PLACE.

GATE.

SPECIFICATION forming part of Letters Patent No. 300,444, dated June 17, 1884.

Application filed November 26, 1883. (No model.)

*To all whom it may concern:*

Be it known that I, JAMES G. CALHOUN, a citizen of the United States, residing at Edinburg, in the county of Portage and State of Ohio, have invented a new and useful Improvement in Swinging and Sliding Gates, of which the following is a specification.

My invention relates to that class of gates which are vertically adjustable with a hinged frame on which they slide, and also swing in either direction.

Figure 1:
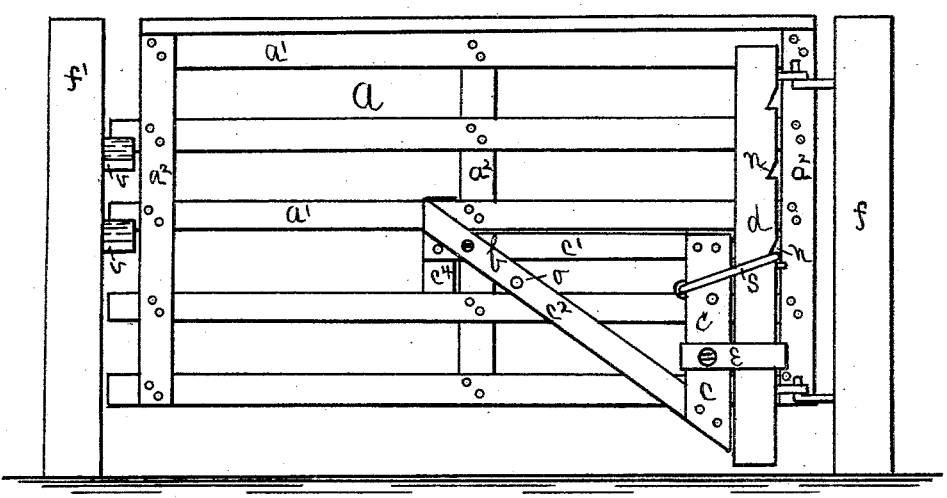
Figure 2:
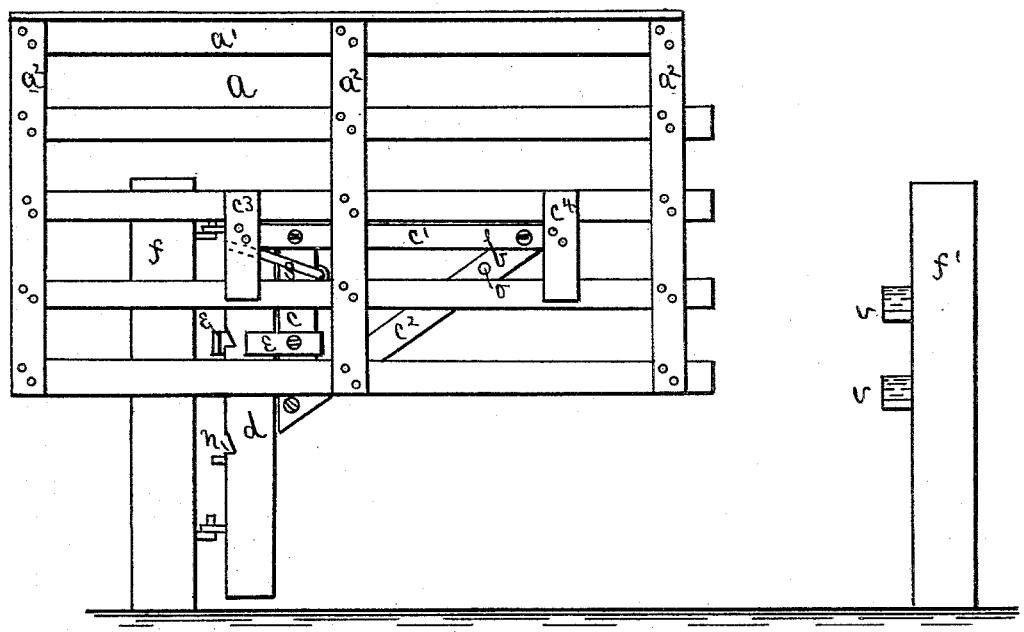

In the drawings forming a part of this specification, Figure 1 is a front elevation representing the gate closed, and Fig. 2 is a rear elevation representing the gate partially opened by sliding and raised with its hinged frame.

The main frame $a$ of the gate is constructed in the ordinary form of boards $a'$ and upright pieces $a^2$, to which the boards are attached. It is supported and slides on a vertically-adjustable frame, $b$, consisting of an upright part or bar, $c$, a horizontal top bar, $c'$, a diagonal bar, $c^2$, and guides $c^3$ $c^4$. Frame $b$ is supported by post $d$, and this post is hinged to post $f$, which enters the ground. The main frame $a$ of the gate is supported on frame $b$ by one of its boards $a'$, which rests on the top of frame $b$. It is retained on one side by guides $c^3$ $c^4$, which are short upright bars attached to top bar, $c'$, and extending up and down against the sides of two consecutive boards, $a'$. It is retained on the other side by the hinged post $d$ and the upper end of diagonal bar $c^2$, extending above top bar, $c'$. Link $s$ clasps and holds together bar $c$ and post $d$. It is hinged to bar $c$ at one end, and the other end rests in either one of a series of notches, $n$, in the side of post $d$. When supporting the gate $a$ and frame $b$ it is in a diagonal position; but when the gate-frame is lifted it turns to a horizontal position, and is then free from notch $n$, and may be moved with the gate-frame $b$ either up or down to either of notches $n$, for the purpose of vertically adjusting the gate. Guide $e$ is a strap bolted to bar $c$, and extends around or partially around post $d$, to act as a guide for frame $b$ and retain the frame and post $b$ in their proper relative positions. Gate $a$ is prevented from being lifted or thrown off the frame $b$ by pin $o$ in diagonal bar $c^2$, extending from the bar over one of the boards $a'$. When closed the front end of the gate is supported by the projecting ends of boards $a'$ resting in the notched blocks $v$, attached to the side of post $f'$. When the gate is open, pin $o$ is slightly above the upper edge of board $a'$, in order that the front end of the gate, when closed, may be slightly lifted from the front end of frame $b$ and be supported on blocks $v$. Guide $e$ is slightly longer than the width of bar $c$ and post $d$, so that the front end of frame $b$ may be lifted when the front end of the gate is being dislodged from blocks $v$ by lifting. Instead of lifting the front end of the gate from blocks $v$, it may be removed from them in opening the gate by sliding it back on frame $b$. The gate is hinged to post $f$ to swing open in either direction. It may also be opened by sliding gate $a$ about half its length back on frame $b$ and then turning it a quarter of a circle. The relative arrangement of notches $n$, boards $a'$, and blocks $v$ is such that when link $s$ is in either of notches $n$ the projecting front ends of one or more of boards $a'$ will be in proper position to be placed in one of the blocks $v$.

The whole of the gate may be made of wood, except the hinges and the link $s$ and guide $e$, which I prefer to be of metal.

I consider the gate herein described to be more particularly adapted for a farm-gate, as it may easily be adjusted vertically to allow the smaller animals—such as sheep and hogs—to pass through, and at the same time prevent the passage of cattle and horses, and when the snow is deep or drifted into banks on either side, the gate may be elevated and opened by sliding and swinging it, or without sliding by swinging it in either direction, to avoid the obstructions.

I claim as my invention—

1. A vertically-adjustable sliding and swinging gate, consisting of a main frame, $a$, and a supporting-frame, $b$, provided with a guide, $e$, and a link, $s$, hinged at one end to the upright part $c$ of frame $b$, in combination with the hinged post $d$, formed with notches $n$ on its side opposite from frame $b$, the link $s$, engaging with the notches and embracing the upright part $c$ of frame $b$, and post $d$, substantially as described.

2. In a vertically-adjustable sliding and swinging gate, the main frame $a$, formed with the front ends of boards $a'$, projecting beyond the upright piece $a^2$, in combination with post $f'$, provided with one or more blocks, $v$, the hinged post $d$, formed with notches $n$, link $s$, and frame $b$, the blocks $v$, boards $a'$, and notches $n$ being relatively arranged substantially as and for the purpose specified.

3. The sliding and swinging gate-frame $a$, formed with boards $a'$, with projecting front ends, in combination with post $f'$, formed with notched blocks $v$, and with the supporting-frame $b$, provided with pin $o$, slightly above board $a'$, link $s$, guide $e$, hinged and notched post $d$, and post $f$, substantially as described.

JAMES G. CALHOUN.

Witnesses:
HARRY D. BEATTY,
BRADFORD HOWLAND.